(12) United States Patent
MacDougall

(10) Patent No.: US 8,167,330 B2
(45) Date of Patent: May 1, 2012

(54) FOLDING, SUPPORT AND SECURITY TRAILER TONGUE

(76) Inventor: Kenneth L. MacDougall, Waverley (CA)

( * ) Notice: Subject to any disclaimer, the term of this patent is extended or adjusted under 35 U.S.C. 154(b) by 340 days.

(21) Appl. No.: 12/513,937

(22) PCT Filed: Oct. 29, 2007

(86) PCT No.: PCT/CA2007/001966
§ 371 (c)(1),
(2), (4) Date: May 7, 2009

(87) PCT Pub. No.: WO2008/055342
PCT Pub. Date: May 15, 2008

(65) Prior Publication Data
US 2009/0322060 A1    Dec. 31, 2009

(30) Foreign Application Priority Data

Nov. 7, 2006   (CA) .................................. 2567427

(51) Int. Cl.
*B60D 1/54*        (2006.01)
(52) U.S. Cl. .................. 280/491.1; 280/475; 280/491.3; 280/491.4
(58) Field of Classification Search ................. 280/475, 280/478, 489, 444, 491.1, 491.3, 491.4
See application file for complete search history.

(56) References Cited

U.S. PATENT DOCUMENTS

| | | | | |
|---|---|---|---|---|
| 2,142,749 A * | 1/1939 | Graves | ........................... | 280/482 |
| 2,474,483 A * | 6/1949 | Luttrell | ...................... | 280/763.1 |
| 2,568,261 A * | 9/1951 | Stade | ......................... | 280/405.1 |
| 3,627,352 A | 12/1971 | Canole | | |
| 4,063,750 A | 12/1977 | Mutchler | | |
| 4,913,451 A | 4/1990 | Woodall | | |
| 4,949,986 A * | 8/1990 | Gohier | ........................ | 280/410 |
| 6,254,117 B1 * | 7/2001 | Cross | ........................... | 280/401 |
| 6,332,626 B1 | 12/2001 | Morrill | | |
| 6,619,686 B1 | 9/2003 | Klar | | |
| 6,846,003 B2 * | 1/2005 | Thompson | .................... | 280/656 |
| 7,090,238 B1 * | 8/2006 | Moore | ......................... | 280/507 |
| 2004/0080141 A1 * | 4/2004 | Hart | ............................. | 280/507 |

FOREIGN PATENT DOCUMENTS

| | | |
|---|---|---|
| CA | 2460262 A1 | 9/2005 |
| WO | 2005/085048 A1 | 9/2005 |

OTHER PUBLICATIONS

International Search Report for PCT/CA2007/001966.

* cited by examiner

*Primary Examiner* — Joanne Silbermann
*Assistant Examiner* — Maurice Williams
(74) *Attorney, Agent, or Firm* — Brooks Kushman P.C.

(57) ABSTRACT

The invention provides space saving, locking and support features for most single pole trailer tongue, having: a support leg, which has the coupler hitch on the opposite end, pivots on the tongue into a vertical position where it acts as a support for the tongue. This leg is secured vertically, using aligned brackets on both sections, by a hitch pin or locking device, so that it can be locked in place as a deterrent to theft. When in the horizontal position, the support leg is secured to the tongue by a hitch pin and may be connected to a towing vehicle. A flip-down leg, pivotally mounted on the tongue, which drops down when the securing hitch pin is removed part way, to provide temporary support for the tongue while the support leg is being moved to the vertical position.

5 Claims, 4 Drawing Sheets

FOLDING, SUPPORT AND SECURITY TRAILER TONGUE

FIELD OF THE INVENTION

The present invention relates to any towable apparatus such as a trailer for transporting any type of equipment, materials or other goods.

BACKGROUND OF THE INVENTION

The tongues of many conventional trailers rest in the dirt and the tongue coupler hitch gets wet, rusted, or full of mud. Many trailers take up a great deal of useful storage space, and it is helpful to have some simple folding characteristics that will minimize the space required. There is an increasing need for security and additional means of deterring theft would be very advantageous.

The present invention evolved from a previous Canadian patent application No. 2,460,262 MULTIPLE USE ADJUSTABLE SECURITY TRAILER FOR TRANSPORTATION, STORAGE AND HOUSING, by the same inventor and seeks to address claims not addressed in that application, which relate specifically to the single pole trailer tongue.

SUMMARY OF THE INVENTION

The present invention provides fold-up, space saving convenience for various types of trailers with a single pole tongue, whether square, rectangular or round.

It is an object of the present invention to provide a pivoting support leg for single pole trailer tongues.

It is an object of the present invention to provide a means of locking the support leg of the single pole trailer tongue securely in place, as a deterrent to theft.

It is also an object of the present invention to provide a flip-down leg, which may be housed inside or outside said tongue, which, in the vertical position, provides support for the single pole trailer tongue while it is being converted from the travel to storage/locking mode.

These proposed components may be modified in size and function to accommodate application to various types of trailer tongues. The support leg might be larger than the tongue, have an open side and pivot on the outside of the tongue, and the flip-down leg would be suitably modified.

Accordingly the present invention provides a single pole trailer tongue which houses a support leg, which pivots on the tongue to the vertical position, and has a ground engaging foot plate to lend support to the tongue. Said support leg has a coupler hitch mounted on the opposite end and when in the horizontal position, said forward hitch means may be connected to a towing vehicle.

Another aspect of the present invention provides a means of securing said support leg in the vertical position with a suitable locking device, so it cannot readily be towed away.

Another aspect of the present invention provides a flip down leg which is utilized to support said tongue while said support leg is being moved to the vertical position.

Additional objects and advantages will become apparent from a careful reading of the detailed description provided herein, with appropriate reference to the accompanying drawings.

BRIEF DESCRIPTION OF DRAWINGS

Embodiments of the invention will be described below with reference to the accompanying drawings, in which.

DETAILED DESCRIPTION OF THE PREFERRED EMBODIMENTS

Figure 1:
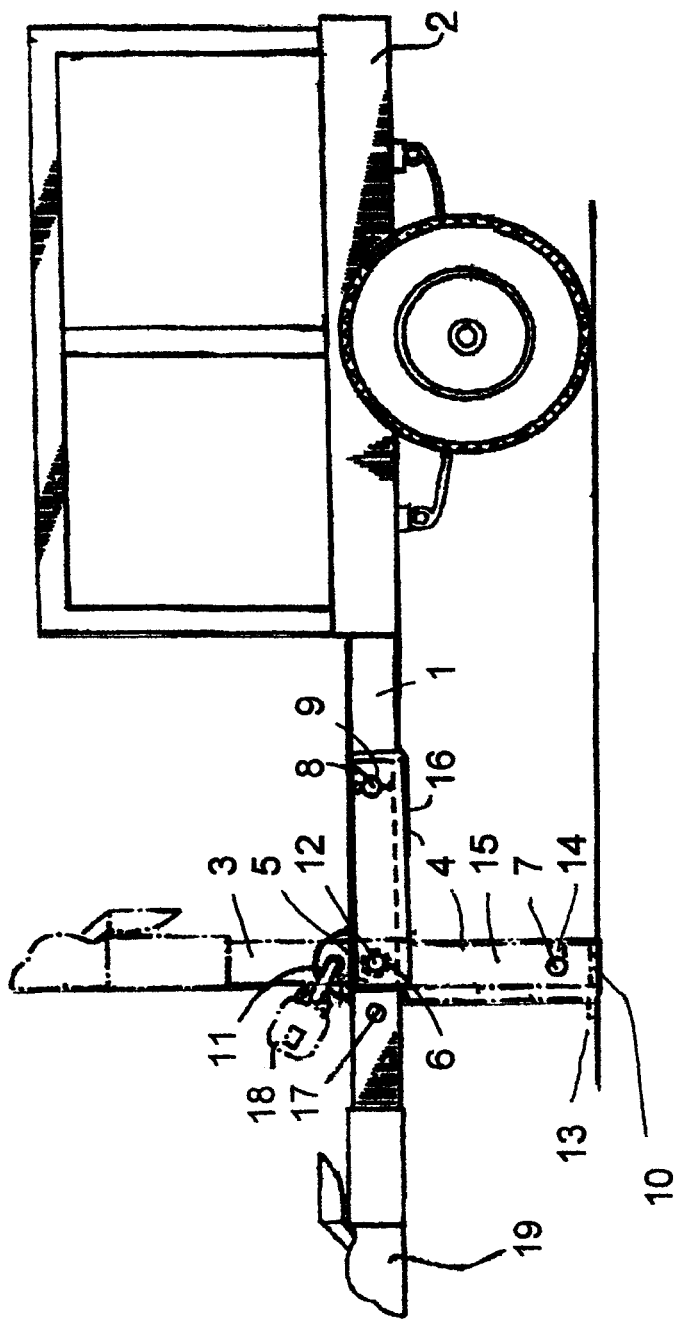
FIG. 1 is a side view of the trailer tongue which embodies the present invention in it's transportation mode, and view of it's storage/locking mode.
Figure 2:
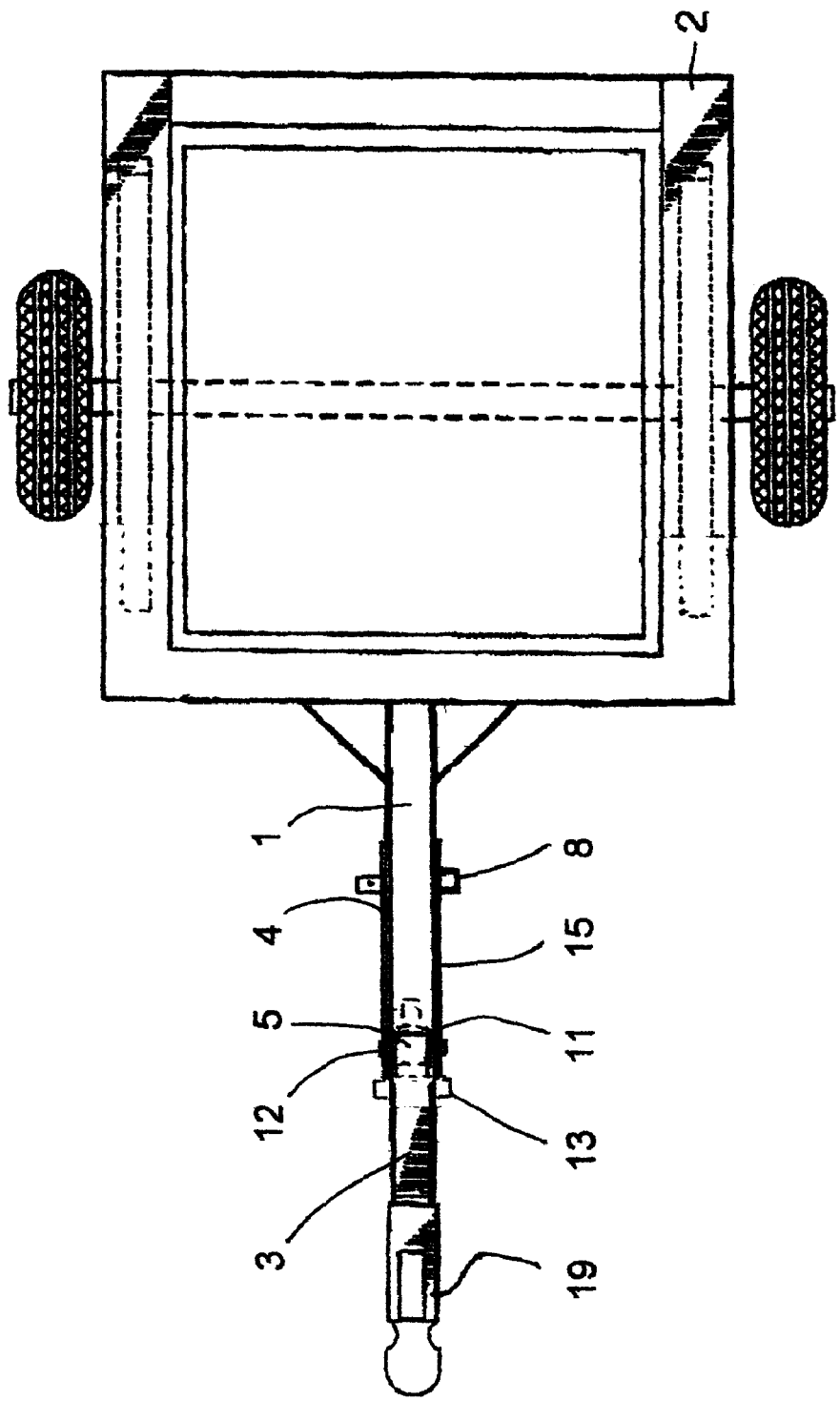
FIG. 2 is a top view illustrating the single pole tongue attached in the transportation mode, and view of the storage/locking mode.
Figure 3:
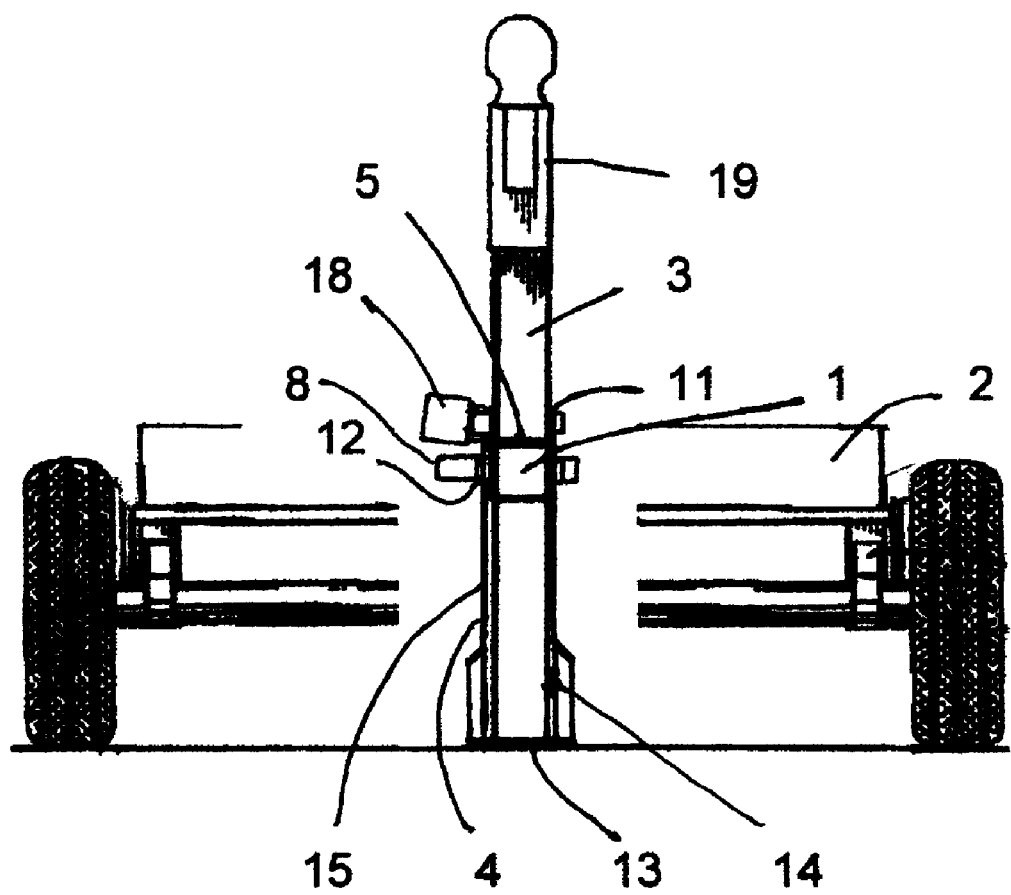
FIG. 3 is a rear cutaway view in it's storage/locking mode.

Referring to FIGS. 1, 2, and 3, the single pole trailer tongue preferably consists of three pieces of metal, or other suitable material, the trailer tongue (1) which is attached at the rear to the frame of the trailer (2) and has a rectangular hollow section at the bottom side, (16) and a smaller hollow section on the top side (5) sufficient in size to accommodate the support leg (3) which has there a pivot means (6) and a pivot pin (12) and separating washers (20) and which has the hitch coupler (19) on the opposite end. The support leg has holes (7) near the ground engaging end, which, when in the horizontal travel mode, are aligned with holes (9) in the tongue (1) to receive a hitch pin (8). When in the vertical position, the support leg (3) has holes, (17) or a bracket with holes, which align with a single or double bracket on the tongue (11) through which a locking hitch pin (8) or other locking device (18) may be inserted. A foot plate (10) is affixed to the ground engaging end of the support leg (3).

A flip-down leg (15) has a hollowed out rear/upper side (4) and is pivotally attached at the pivot point (6) by pivot pin (12) and is held in the horizontal travel position by a hitch pin (8) aligned with holes through the tongue (9). It may pivot up inside the tongue (1), or outside, as preferred. Only one side of the flip-down leg has a hole, aligned with (7) of the support leg, as the opposite side is notched out at that location (14) so that when a hitch pin (8) is pulled part way out (from the notched side), the flip-down leg (15) drops down to the vertical position. It has a foot plate (13) and holes near the ground engaging end (7) which align with holes in the support leg (3).

Figure 4:
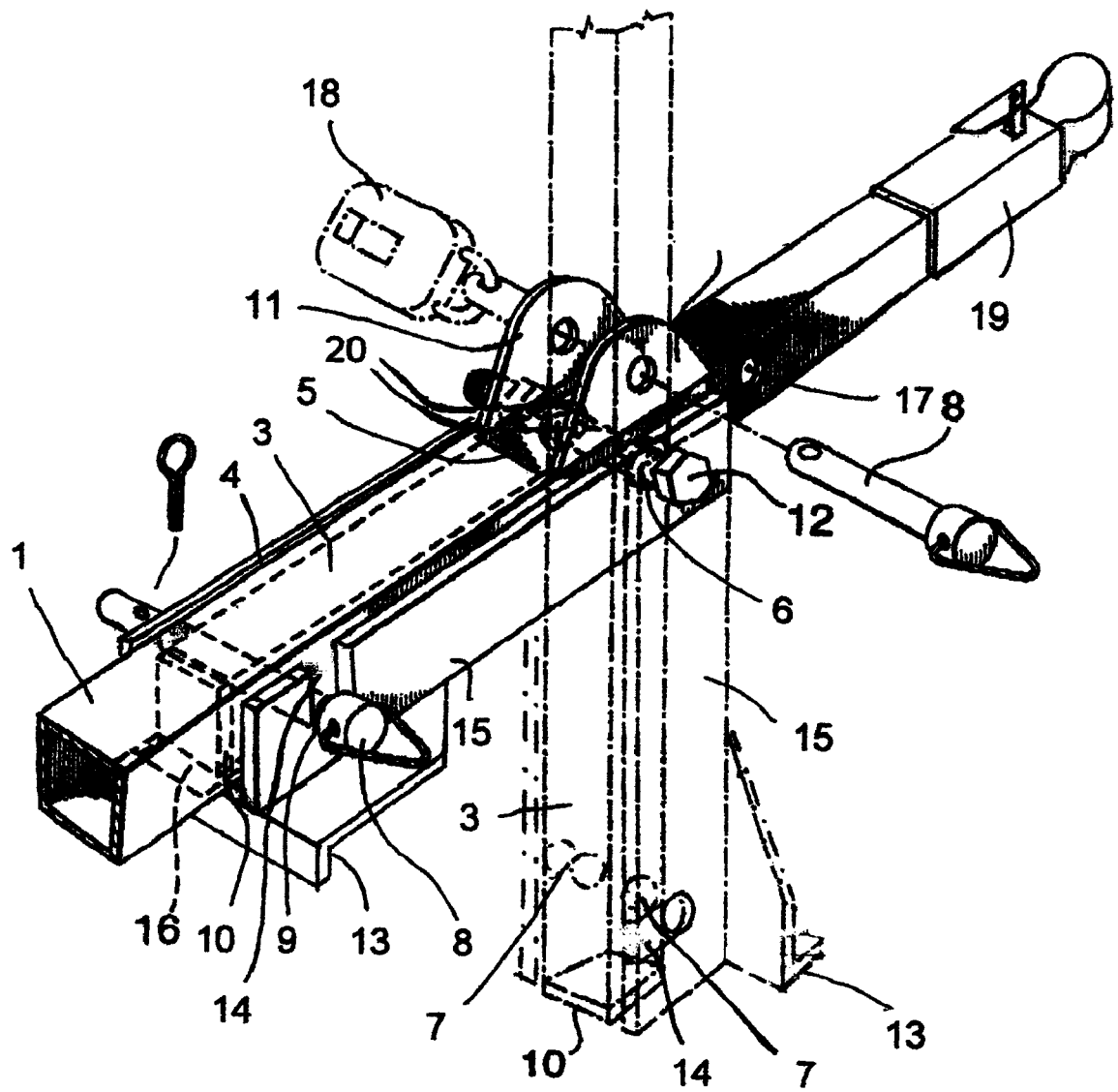
FIG. 4 is a magnified view of a pivot means and a hitch means of the trailer tongue in it's transportation mode and view in it's storage/locking mode.

Referring now to FIG. 4, a pivot means, a hitch means and a vertical hitch pin means (11) are mounted to one or both sides of the tongue (1) in order to enable said tongue to convert to a storage/locking mode. When the hitch pin (8) is removed part way from the hitch means, a flip-down leg (15) pivots downward on the pivot means into a vertical position to engage the ground and support the tongue. Said leg is not held in place when the hitch pin is partially removed as there is an open notch (14) in the side of the leg. When said hitch pin is completely removed, it allows the support leg (3) to pivot freely on the pivot means and holes (17) may be vertically aligned with holes in the brackets (11) on the tongue and a locking hitch pin or other suitable locking device may be inserted. This securely locks the support leg and hitch means in a vertical position, so the trailer cannot readily be towed away. The support leg (3) has foot plate (10) at the ground engaging end. The flip-down leg (15) also has a foot plate, (13) which, in the secured upward position, protrudes outwardly from the side of said tongue. This provides for manual manipulation of the flip-down-leg if required. A hitch pin, or The embodiments of the invention in which an exclusive property or privilege is claimed are defined as follows:

1. A tongue for hitching a trailer to a vehicle and for supporting the trailer when it is unhitched from the vehicle, comprising:
   a. a first, fixed tongue member securely engageable with the trailer;
   b. a second, pivotable tongue member having a first, front end section, a second, rear end section, and an intermediate section between the first end section and the second end section;
   c. hitching means in secure engagement with the first end section of the second tongue member to securely and temporarily hitch the second tongue member to the vehicle;
   d. pivot means connecting the intermediate section of the second tongue member to the first tongue member to allow pivoting of the second tongue member in relation to the first tongue member between a first position in which the second tongue member is generally aligned with the first tongue member, and a second position generally perpendicular to the first position;
   e. means for temporarily securing the second tongue member to the first tongue member in the first and second positions;
   f. a flip-down leg also mounted on said pivoting means for movement between a first position, in which it extends rearwardly beside said first tongue member, and a second, lowered position in which it extends downwardly from said pivot means and can support the trailer; and
   g. wherein the flip down leg is of channel form, having a first channel side portion provided with an aperture and an opposing second channel side portion being recessed, said means for temporarily securing the second tongue member to the first tongue member includes a hitch pin, and said hitch pin passes through said aperture in the flip-down leg for supporting the flip-down leg in said first position;
   the arrangement being such that said hitch pin is movable to a partially withdrawn position where it releases the flip-down leg while the hitch pin still secures the second tongue member to the first tongue member in said first position of the second tongue member, thus allowing said flip-down leg to move to its second, lowered position and to support the trailer while the hitch pin is fully removed and while the second tongue member is moved from its first position to its second position.

2. A tongue according to claim 1, wherein, in the second position of the second tongue member, the securing means secures the latter member in its second position in which the second, rear end thereof extends downwardly along the flip-down leg, and in which a hitch pin can secure the flip-down leg to the second end section of the second tongue member.

3. A tongue according to claim 1, wherein a ground engaging foot plate is securely attached to the flip-down leg and is engageable with the ground when the flip-down leg is secured in the second position.

4. A tongue for hitching a trailer to a vehicle and for supporting the trailer when it is unhitched from the vehicle, comprising:
   a. a first, fixed, tongue member securely engageable with the trailer;
   b. a second, pivotable, tongue member having a first, front end section, a second, rear end section, and an intermediate section between the first end section and the second end section;
   c. hitching means in secure engagement with the first end section of the second tongue member to securely and temporarily hitch the second tongue member to the vehicle;
   d. pivot means connecting the intermediate section of the second tongue member to the first tongue member to allow pivoting of the second tongue member in relation to the first tongue member between a first position in which the second tongue member is generally aligned with the first tongue member, and a second position generally perpendicular to the first position;
   e. means for temporarily securing the second tongue member to the first tongue member in the first and second positions;
   f. a flip-down leg also mounted on said pivoting means for movement between a first position, in which it extends rearwardly beside said first tongue member, and a second, lowered position in which it extends downwardly from said pivot means and can support the trailer;
   g. wherein said means for temporarily securing the second tongue member to the first tongue member includes a hitch pin, said hitch pin passes through an aperture in the flip-down leg for supporting the flip-down leg in said first position, and the flip-down leg has a side portion extending rearwardly of said pivot means on one side of the first tongue member, and wherein the said hitch pin is removable from the side of the first tongue member opposite to said one side;
   the arrangement being such that said hitch pin is movable to a partially withdrawn position where it releases the flip-down leg while the hitch pin still secures the second tongue member to the first tongue member in said first position of the second tongue member, thus allowing said flip-down leg to move to its second, lowered position and to support the trailer while the hitch pin is fully removed and while the second tongue member is moved from its first position to its second position.

5. A method for converting a trailer tongue from a transportation mode into a storage/locking mode, wherein the trailer tongue has a first, tongue member fixed to the trailer, and a second, pivotable, tongue member having a first, front end section with hitching means connectable to the vehicle, a second, rear end section, and an intermediate section between the first end section and the second end section, with pivot means connecting the intermediate section of the second tongue member to the first tongue member for movement of the second tongue member between first and second positions; and means for temporarily securing the second tongue member to the first tongue member in the first and second positions, the trailer tongue also having a flip- down leg also mounted on said pivoting means, a hitch pin for temporarily connecting the flip-down leg and the first tongue member, and a hitch pin for securing the flip-down leg in a vertical position, the method comprising the steps of:
   a. disconnecting the hitching means on the first section of the second tongue member from the tow vehicle;
   b. withdrawing said hitch pin from the first tongue member to a partial first position thereby releasing the flip-down leg;
   c. pivoting the flip-down leg into a substantially vertical position, thereby contacting the ground and supporting the trailer, while the first and second tongue members remain secured together by the partially withdrawn hitch pin;
d. withdrawing the hitch pin to a fully detached second position thereby releasing the second end of the second tongue member;
e. pivoting the first end section of the second tongue member upward to a vertical position about the pivot means and the second, rear end section of the second tongue member to contact the ground and additionally support the trailer;
f. securing the second tongue member in the vertical position by insertion of a locking device connecting the first tongue member and the second tongue member; and
g. inserting a hitch pin through both the flip-down leg and the second, rear end section of the second tongue member, thereby further securing the second tongue member in a vertical position.

* * * * *